United States Patent
Long et al.

(10) Patent No.: US 8,139,522 B2
(45) Date of Patent: Mar. 20, 2012

(54) METHOD FOR ESTABLISHING HRPD NETWORK PACKET DATA SERVICE IN 1X NETWORK

(75) Inventors: Shuiping Long, Shenzhen (CN); Zhiming Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 11/558,713

(22) Filed: Nov. 10, 2006

(65) Prior Publication Data
US 2007/0274217 A1 Nov. 29, 2007

(30) Foreign Application Priority Data
May 25, 2006 (CN) .......................... 2006 1 0081099

(51) Int. Cl.
*H04J 1/16* (2006.01)
*G06F 15/16* (2006.01)
(52) U.S. Cl. .................... 370/328; 370/235; 709/228
(58) Field of Classification Search .................. 370/338, 370/331, 352, 328, 332, 216, 335, 458, 315; 709/249; 455/518
See application file for complete search history.

(56) References Cited

U.S. PATENT DOCUMENTS

| | | | |
|---|---|---|---|
| 2003/0053429 A1 | 3/2003 | Choi et al. | |
| 2003/0135626 A1* | 7/2003 | Ray et al. | 709/228 |
| 2004/0085931 A1 | 5/2004 | Rezaiifar | |
| 2005/0259623 A1* | 11/2005 | Garudadri et al. | 370/335 |
| 2005/0276273 A1 | 12/2005 | Oprescu-Surcobe et al. | |
| 2006/0039310 A1* | 2/2006 | Julka et al. | 370/315 |
| 2006/0072506 A1 | 4/2006 | Sayeedi et al. | 370/331 |
| 2006/0116149 A1* | 6/2006 | Dunn et al. | 455/518 |
| 2006/0209751 A1 | 9/2006 | Hsu et al. | |
| 2006/0251058 A1* | 11/2006 | Xu et al. | 370/352 |
| 2006/0268840 A1* | 11/2006 | Xu et al. | 370/352 |
| 2007/0047562 A1* | 3/2007 | Sayeedi et al. | 370/401 |

(Continued)

FOREIGN PATENT DOCUMENTS
CN 1487689 A 4/2004
(Continued)

OTHER PUBLICATIONS
International Search Report for International Application No. PCT/CN2006/002477, dated Mar. 15, 2007.
(Continued)

*Primary Examiner* — George Eng
*Assistant Examiner* — Nizar Sivji
(74) *Attorney, Agent, or Firm* — Finnegan, Henderson, Farabow, Garrett & Dunner LLP (57) ABSTRACT

A method for an Access Terminal (AT) in a 1x network to establish an High Rate Packet Data (HRPD) network packet data service includes: initiating, by the AT, a session establishment request to a target Access Network/Packet Control Function (AN/PCF) of an HRPD network; establishing, by the target AN/PCF, an HRPD session with the AT after obtaining session information of an existing HRPD session; performing, by the target AN/PCF and the AT, session configuration based on the obtained session information, and establishing a data connection for the packet data service. In the present invention, an AT in the 1x network can establish a packet data service with an HRPD network when there is an existing packet data session in the HRPD network. The present invention is advantageous for seamless service handoff between the 1x network and the HRPD network, thereby realizing complement of the two networks and improving user experience.

3 Claims, 4 Drawing Sheets

U.S. PATENT DOCUMENTS

2007/0143483 A1* 6/2007 Lim et al. .................. 709/227

FOREIGN PATENT DOCUMENTS

| CN | 1758805 A | 4/2006 |
|---|---|---|
| CN | 1983905 A | 6/2007 |
| CN | 101199226 A | 6/2008 |
| JP | 2003519994 A | 6/2003 |
| JP | 2006506005 A | 2/2006 |
| JP | 2008503189 A | 1/2008 |
| WO | WO 01/67786 A2 | 9/2001 |
| WO | WO 2004/043108 | 5/2004 |
| WO | WO-2004/079947 A1 | 9/2004 |
| WO | WO 2005/125110 | 12/2005 |

OTHER PUBLICATIONS

3$^{rd}$ Generation Partnership Project 2 "3GPP2", "cdma2000 High Rate Packet Data Air Interface Specification", 3GPP2 C.S0024-A, Version 2.0, Jul. 2005, 1,227 pgs.

Japanese Notice of Reasons or Rejection dated Aug. 4. 2011, issued in related Japanese Application No. 2009-511320, 5 pages.

First Chinese Office Action dated (mailed) Jun. 24, 2010, issued in related Chinese Application No. 200680013220.1, Huawei Technologies Co., Ltd.

First Chinese Office Action dated (mailed) Jul. 10, 2009, issued in related Chinese Application No. 200610081099.8, Huawei Technologies Co., Ltd.

European International Search Report dated (mailed) May 9, 2007, issued in related Application No. 06255811.9-2414, Huawei Technologies Co., Ltd.

Written Opinion of the International Searching Authority (translation) dated (mailed) Mar. 15, 2007, issued in related Application No. PCT/CN2006/002477, filed Sep. 21, 2006, Huawei Technologies Co., Ltd.

Anonymous, "Project No. 3-Q091-RV1; proposed creation of a new TIA Standard Interoperability Specification (IOS) for High Rate Packet Data (HRPD) Radio Access Network Interfaces with Session Control in the Packet Control Function (if approved, to be published as TIA-1878-A)" EIAITIA Standards and Drafts, Telecommunications Industry Association, Arlington, VA, US, May 26, 2005, XP017005064, pp. 3-31 through 3-34, total of 4 pgs.

* cited by examiner

METHOD FOR ESTABLISHING HRPD NETWORK PACKET DATA SERVICE IN 1X NETWORK

CROSS-REFERENCE TO RELATED APPLICATION

This application claims the benefit of Chinese Patent Application No. 200610081099.8, which was filed on May 25, 2006, the entire disclosure of which is hereby incorporated herein by reference.

BACKGROUND OF THE DISCLOSURE

1. Field of the Technology

The present invention relates to information interaction between Access Terminal (AT) and High Rate Packet Data (HRPD) network, and more particularly, to a method for establishing HRPD network packet data service in a 1x network.

2. Background of the Invention

Code Division Multiple Access (CDMA) 2000 1x network has widespread users. It mainly provides circuit-switched voice service and medium and low rate data service. CDMA2000 1x EV-DO, also called as HRPD, is designed to optimize data applications. The peak data rate of the HRPD Release A reaches 1.8 Mbps on reverse link and 3.1 Mbps on forward link. Closed-loop rate control and capacity enhancing scheduler are key characters to the outstanding performance of the HRPD which transfers data to every user at highest possible rate in burst mode. In other words, it can dynamically select modulation mode and transmission period according to channel conditions to obtain the best performance.

The HRPD Release A also provides enhancement for other features including Quality of Service (QoS), instant multimedia service, Location Based Service (LBS), equalizer, receiving diversity, Voice over IP (VoIP) and multi-carrier. QoS allows the HRDP to handle different applications, such as VoIP and video phone with different methods, so that operators may set different charging rate according to data flow and QoS level.

The HRPD may be used to construct a wireless mobile data network independently or hybrid with the CDMA 1x to complement each other so as to fulfill the function requirements set by International Telecommunication Union (ITU) on 3G systems. As the 3G service market has not been matured, and in consideration of network construction cost, the first phase of the HRPD network construction usually adopts hot spot coverage. Thus the problem of service handoff between the CDMA 1x and the HRPD network emerges on the edge of the HRPD network. And at the same time, within the HRPD network, the same problem is brought out by load adjustment between the CDMA 1x and the HRPD network. Hence research on seamless service handoff between the CDMA 1x and the HRPD network is needed. Seamless handoff means extremely short service interruption during handoff, thus the two networks may complement each other while ensuring user satisfaction.

An AT does not occupy any wireless traffic channel in an HRPD network, yet it maintains a Point-to-Point Protocol (PPP) logic connection to a Packet Data Serving Node (PDSN) which keeps an A10 connection to a Packet Control Function (PCF). This is called a dormant packet data session between the AT and the HRPD network. When the network wants to send data to the AT, and if the AT is monitoring the HRPD network, the AT actively initiates a connection establish request to activate the packet data session after receiving a Page message issued by an Access Network (AN). And the AN assigns a wireless traffic channel to the AT and establishes a cable connection, i.e., an A8 connection, then transmits data to the AT. If the AT is in service in the 1x network, the HRPD network requests the 1x network to send a Page message to the AT, then the AT decides by itself whether to switch to the HRPD network to receive data. When the AT wants to send data to the HRPD network, it activates the packet data session. And after the data transmission is completed, when no data interaction goes on between the AT and the HRPD network for a certain period of time, the packet data session is returned to the dormant state. A dormant handoff refers to a process of transferring, due to the mobility of the AT, HRPD session information from a source AN PCF to a target AN/PCF in preparation for packet data service activation. The HRPD session information includes an HRPD air interface protocol attribute value and a relevant public data value. The active state refers to a state in which the service data are transmitted. During the transmission, an A10 connection handoff may be triggered, wherein the A10 connection is a connection between the HRPD network and the AN/PCF, i.e., a new connection is established while the old connection is released.

Figure 1:
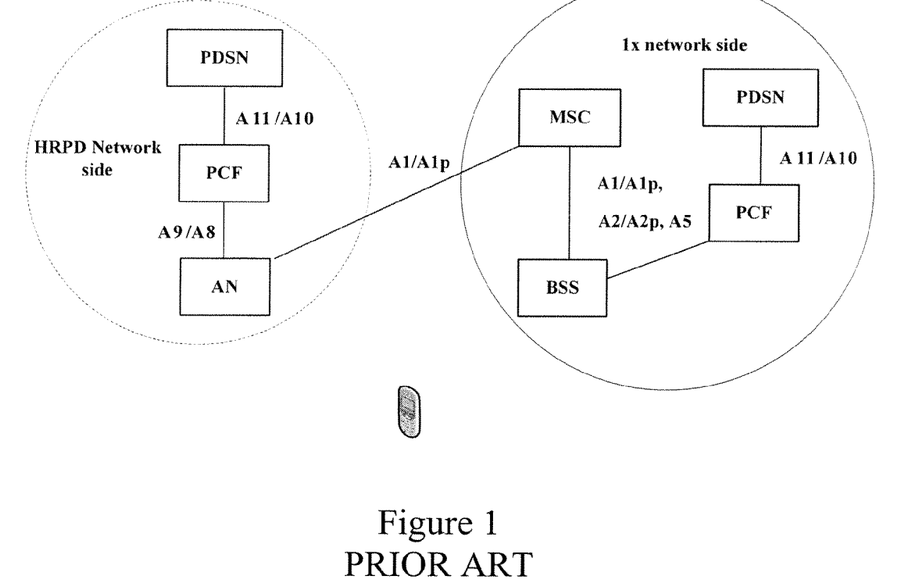
FIG. 1 is a schematic diagram illustrating a structure of an A1/A1p-interface-based connection between the HRPD network and the 1x network according to the related art.
Figure 2:
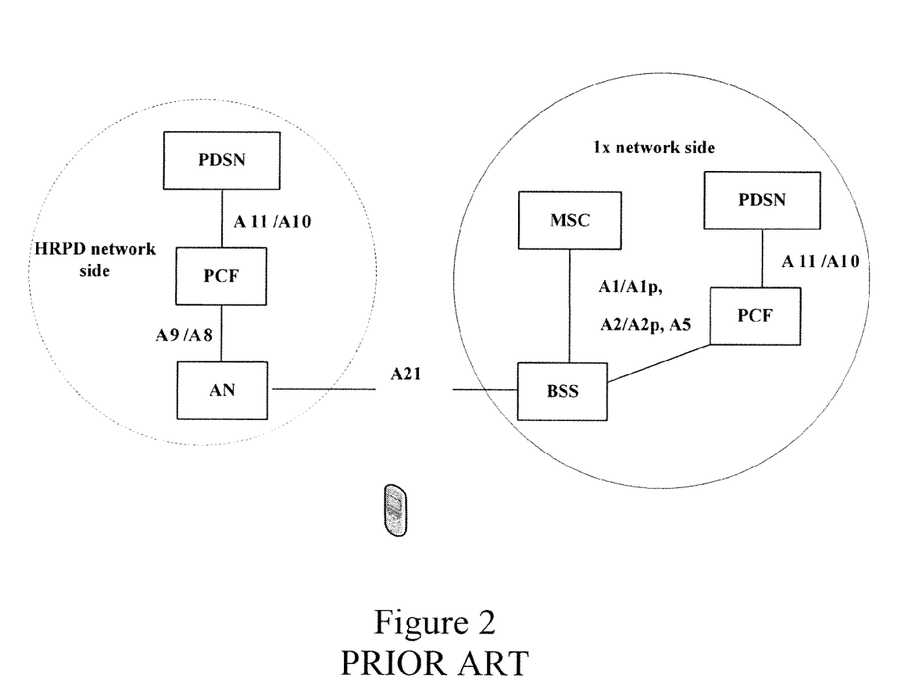
FIG. 2 is a schematic diagram illustrating a structure of an A21-interface-based connection between the HRPD network and the 1x network according to the related art.

As shown in FIG. 1 and FIG. 2, there are two methods to connect the HRPD network and the 1x network, and the two methods may co-exist. On the HRPD network side, there is a PDSN, a PCF and an AN. On the 1x network side, there is a Mobile Switching Center (MSC) and a Base Station Controller (BSC). In the first method, the HRPD network and the 1x network are connected through signaling interface A1/A1p. The A1 interface is based on circuit connection and the A1p interface is based on IP connection. And the signaling interface A1/A1p is mainly used for transmitting 1x circuit-switched service related signaling. In the second method, the HRPD network and the 1x network are connected through a signaling interface A21 which is mainly used for transmitting 1x air interface related messages when the AT is in an HRPD network service.

For an HRPD/1x dual mode AT with a single stand-by mode, it is impossible to enable two wireless interfaces at the same time, which brings difficulties to handoff between networks. It will be advantageous for the seamless handoff between the 1x network and the HRPD network if the AT can establish a packet data service in the HRPD network by virtue of the 1x network wireless interface when working in the 1x network.

When there is no packet data session between the AT and the HRPD network, the process of establishing a packet data service by an AT with an HRPD network in the 1x network includes the steps of:

1. establishing a channel on the 1x network air interface to bear information flow between the AT and the HRPD network when the AT needs to establish a packet data service;
2. establishing an HRPD session between the AT and the AN, including Unicast Access Terminal Identifier (UATI) assignment, session negotiation, and possibly access authentication, etc.;
3. assigning a wireless traffic channel;
4. establishing a connection between the AN and the PCF and a connection between the PCF and the PDSN;
5. establishing a PPP connection between the AT and the PDSN, maybe involves a Mobile IP (MIP) registration.

The method described above is used for establishing a packet data service by an AT in the 1x network with an HRPD network when there is no packet data session between the AT and the HRPD network. The method, however, does not give a solution to establish a new HRPD service when there is an existing dormant session.

SUMMARY OF THE INVENTION

An embodiment of the present invention provides a method for establishing HRPD network packet data service by an Access Terminal (AT) in a 1x network when there is an existing dormant packet data session between the AT and a High Rate Packet Data (HRPD) network, so as to solve the problem that a new HRPD service cannot be established when the AT works in the 1x network and a dormant packet data session already exists in the HRPD network.

An embodiment of the present invention provides a method for establishing an HRPD network packet data service by an AT in the 1x network; the method includes:

initiating, by the AT, a session establishment request to a target Access Network/Packet Control Function (AN/PCF) of an HRPD network;

establishing, by the target AN/PCF, an HRPD session with the AT after obtaining session information of an existing HRPD session;

performing, by the target AN/PCF and the AT, a session configuration based on the obtained session information, and establishing a data connection for a HRPD network packet data service.

In the present invention, an AT which is in service in a 1x network, such as voice or Short Message Service (SMS), initiates the establishment of an HRPD network packet data service through the 1x air interface and a connection between the 1x network and the AN of an HRPD network. Thus the present invention makes it possible to establish an HRPD network packet data service when the AT works in the 1x network with an existing dormant packet data session in the HRPD network. The present invention is advantageous to seamless service handoff between the 1x network and the HRPD network so that the two networks may complement each other and thus improves user experience.

DETAILED DESCRIPTION OF THE PREFERRED EMBODIMENTS

In embodiments of the present invention an AT may initiate the establishment of an HRPD network packet data service through a 1x network air interface and a connection between the 1x network and the AN of an HRPD network when the AT is in service in the 1x network such as voice or SMS. In addition, if the source AN/PCF and the target AN/PCF are not the same AN/PCF in the above process, an HRPD network dormant handoff is required.

When there is an existing packet data session between an AT and an HRPD network and the packet data session is in a dormant state, the present invention enables the AT to establish a new packet data service with the HRPD network During the establishment of the new packet data service, if the source AN/PCF is different from the target AN/PCF, a dormant handoff is required; if the source AN/PCF and the target AN/PCF are the same AN/PCF, a new service will be established directly. But the establishment is different from that in the related art when there is no existing packet data session. The embodiments of the present invention modifies the configuration of an existing HRPD session and adds an appropriate new service to the HRPD session instead of establishing a new HRPD session for the service and assigning a PPP connection to the new HRPD session.

AN and PCF are two independent network devices, and important session management/mobility management function of an HRPD network can be implemented either in AN or in PCF. However, in practical applications, AN and PCF are usually combined together and a private interface is installed between them. The two devices are called by a joint name AN/PCF in embodiments of the present invention just for convenience, yet it does not mean that a certain AN has to correspond to a certain PCF, for example, (AN/PCF) 1 and (AN/PCF) 2 may have different ANs but the same PCF.

Figure 3:
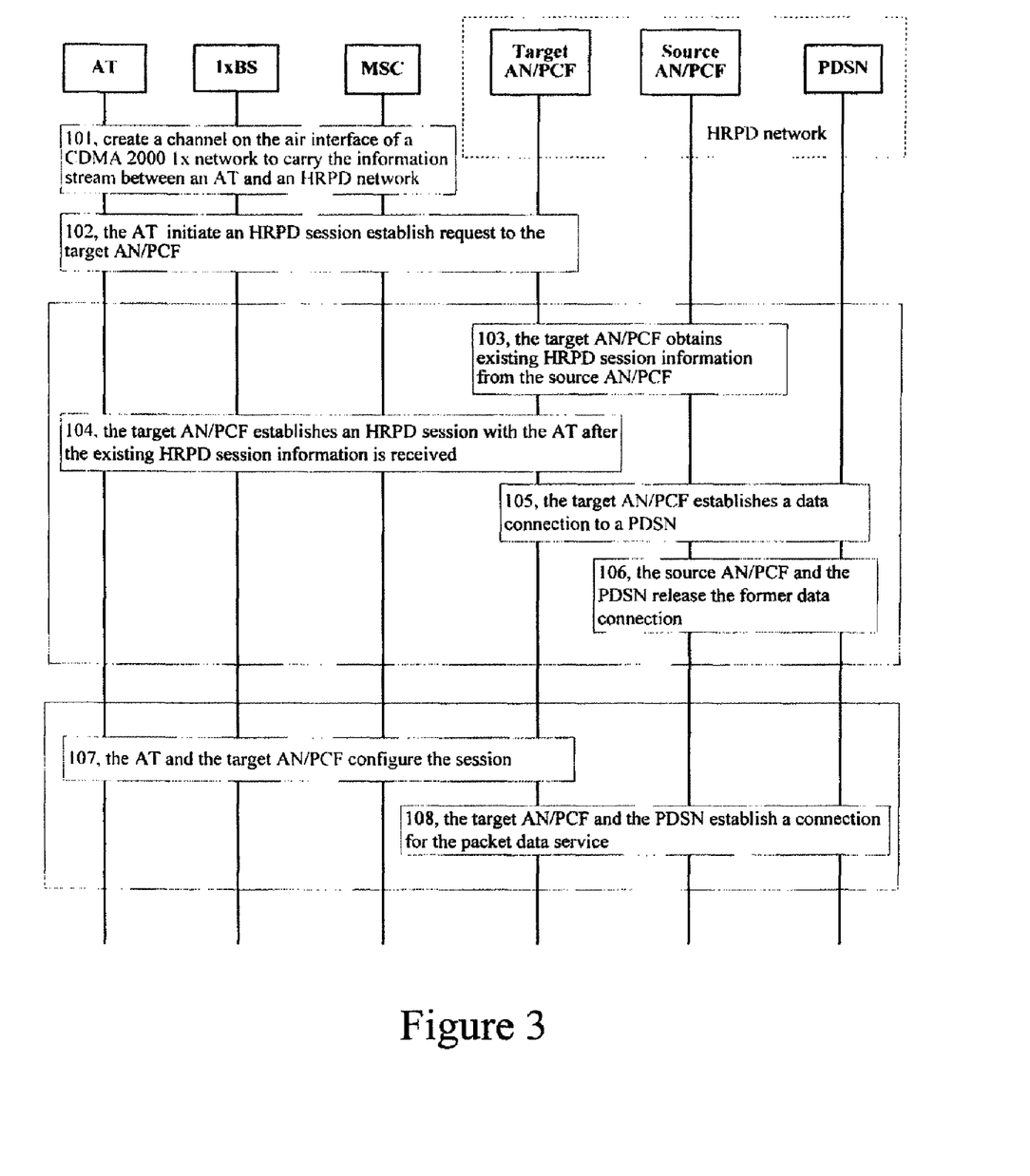
FIG. 3 is a flow chart of illustrating a process of an AT establishing an HRPD network packet data service in the 1x network according to an embodiment of the present invention.

FIG. 3 is a flow chart illustrating a process of an AT establishing an HRPD network packet data service in the 1x network according to an embodiment of the present invention. The embodiment includes:

Step 101: create a channel on a 1x network air interface to bear the information flow between an AT and an HRPD network; the channel can be created through two methods:

A: the AT negotiates with the 1x network to apply for a new wireless traffic channel which can serve as the channel between the AT and the HRPD network, and the channel can be a Dedicated Control Channel (DCCH). The process includes:

sending, by the AT to the BS, a service request which includes a service configuration information record including multiplex option, a traffic channel request and a service ID, etc.; and returning, by the BS, a service connection response which includes a valid starting time of the service configuration and a service configuration information record including multiplex option, traffic channel assignment and a service ID;

B: the AT initiates a 1x packet service request to obtain a wireless traffic channel as the channel between the AT and the HRPD network, wherein the 1x BS does not establish an A8 connection with the 1x PCF and the established channel is an SCCH or an SCH. The channel establishment includes:

sending, by the AT, an enhanced origination message to the BS;

sending, by the BS, an adding service request to the MSC after returning a BS acknowledgement instruction;

returning, by the MSC, an assignment request;

performing, by the BS and the AT, a service negotiation between them, the negotiation is similar to that in method A;

The channel established following the method A bears the information flow data between the AT and the HRPD network with data burst messages while the channel established following the method B transmits the information flow data directly;

A channel occupied by an existing service may also serve as the channel between the AT and the HRPD network by utilizing the signaling transmission capacity of the channel. At this time, the channel is an FCH which bears the information flow between the AT and the HRPD network with data burst messages. Therefore, there is no need to establish a new 1x traffic channel. Step 102 can be performed directly.

Step 102: the AT initiates an HRPD session establish request to the target AN/PCF to verify whether the target AN/PCF and the source AN/PCF is the same AN/PCF, if they are the same AN/PCF, go to Step 107; otherwise, go to Step 103;

Step 103: the target AN/PCF obtains session information of the existing HRPD session of the AT from the source AN/PCF;

Step 104: the AT and the target AN/PCF establish an HRPD session;

Step 105: the target AN/PCF establishes a data connection with the PDSN;

Step 106: the source AN/PCF and the PDSN release the old data connection; when there are multiple dormant packet data services, Step 105 and Step 106 shall be repeated until all the services are switched to the new data connection;

Step 107: the AT and the target AN/PCF configure the session through a process including the steps of:

sending, by the AT, a configuration request which includes an attribute record A to the target AN/PCF;

returning, by the target AN/PCF, a configuration response which includes an attribute record B, wherein the attribute B is a subset of the attribute A and is supported by both the AT and the target AN/PCF; therefore the information flow is configured and the QoS of the information flow is updated;

Step 108: the target AN/PCF and the PDSN establish a connection between them for packet data service through a process including the steps of:

sending, by the target AN/PCF to the PDSN, an A11 registration request which includes the lifecycle of the A10 connection between the target AN/PCF and the PDSN for service data transmission;

returning, by the PDSN, an A11 registration response to complete the establishment of the A10 connection, wherein the A11 connection is used for transmitting signaling between the target AN/PCF and the PDSN.

The AT does not need to establish a PPP connection to the PDSN after Step 108.

Figure 4:
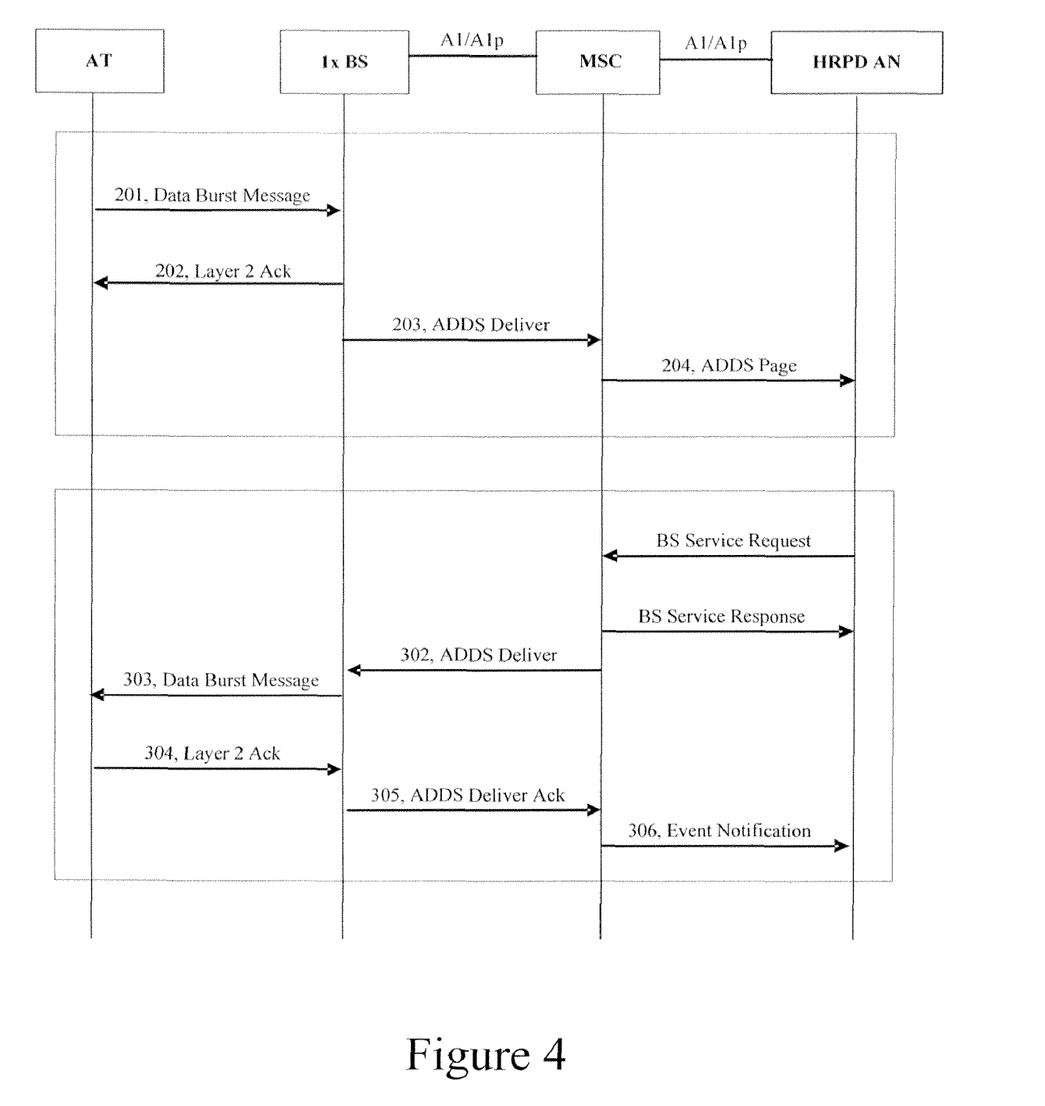
FIG. 4 is a flow chart of a first way for information interaction between an AT in the 1x network and an HRPD network according to an embodiment of the present invention.

In the fore-going process, there are two ways to transmit signaling between the AT in the 1x network and the AN/PCF in the HRPD network. One is connecting the AN/PCF to the MSC through an A1/A1p interface; the other is connecting the AN/PCF directly to the BS through an A21 interface. The process adopting the first way is shown in FIG. 4, including:

The process of sending information by the AT to the AN/PCF includes:

Step 201: send a Data Burst Message by the AT to the BS in the 1x network through a 1x network air interface;

Step 202: return a layer 2 Ack by the BS to the AT through the 1x network air interface;

Step 203: send an ADDS Deliver message by the BS to the MSC through the A1/A1p interface;

Step 204: send an ADDS Page message by the MSC to the AN/PCF.

The process of sending information by the AN/PCF to the AT includes:

Step 301: send a BS Service Request by the AN/PCF to the MSC;

Step 302: send an ADDS Deliver message by the MSC to the BS through the A1/A1p interface after the MSC returns a BS Service Response to the AN/PCF;

Step 303: return a Data Burst Message by the BS to the AT through the channel on the 1x network air interface;

Step 304: send a Layer 2 Ack by the AT to the BS through the channel on the 1x network air interface;

Step 305: send an ADDS Deliver Ack message by the BS to the MSC through the A1/A1p interface;

Step 306: send an Event Notification by the MSC to the AN/PCF notifying that the service data have been successfully sent to the AT.

Corresponding modifications of the protocol in the related art are required in the foregoing method, including: extending the Data Burst Message, extending the definition of the ADDS User Part field in the ADDS Page message, the ADDS Deliver message and the BS Service Request, and extending the definition of the Event field in the Event Notification.

1) The extension of the 1x air interface Data Burst Message

Specifically, it is a creation of a new data burst type, wherein the format and the modification of the Data Burst Message are listed in the table below:

TABLE 1

| Field | Length (bits) |
| --- | --- |
| MSG_NUMBER | 8 |
| BURST_TYPE | 6 |
| NUM_MSGS | 8 |
| NUM_FIELDS | 8 |
| CHARi | 8 |

The BURST_TYPE in the related art has reached the value "000111", and the values from "001000" to "111101" are reserved. So a value such as "0010000" can be chosen as the new value of the BURST_TYPE. The definitions of other fields in the Data Burst Message are described below:

MSG_NUMBER is an index number of the Data Burst Message in a data burst flow;

NUM_MSGS is the total number of segmented Data Burst Messages in the current data burst flow;

NUM_FIELDS is the number of data bytes carried by the Data Burst Message.

CHARi is the data carried by the Data Burst Message.

2) The extension of the information element in the ADDS User Part in an ADDS Page message is listed below:

TABLE 2

| 7 | 6 | 5 | 4 | 3 | 2 | 1 | 0 | Octet |
| --- | --- | --- | --- | --- | --- | --- | --- | --- |
| => ADDS User Part: A1 Element Identifier = [3DH] | | | | | | | | 1 |
| Length = <variable> | | | | | | | | 2 |
| Reserved | | | Data Burst Type = [ [000011] (SMS), [000101] (PDS), [000110] (SDB), [001000] (HRPD-INF) ] | | | | | 3 |
| MSB | | | Application Data Message = <any value> | | | | | 4 |
| ... | | | | | | | | |
| | | | | | | | LSB | n |

As shown in the table above, a new suggested value "001000" is defined in the Data Burst Type to indicate that the Application Data Message carries the HRPD network application data, i.e., the data carried by the Data Burst Message.

3) The extension of information elements of the ADDS User Part in an ADDS Deliver message is listed below:

TABLE 3

| 7 | 6 | 5 | 4 | 3 | 2 | 1 | 0 | Octet |
|---|---|---|---|---|---|---|---|---|
| => ADDS User Part: Length = <variable> | | | | | | | | 1 |
| Reserved [00] | | | Data Burst Type = [ [000011] (SMS), [000100] (OTASP), [000101] (PDS), [000110] (SDB), [001000] (HRPD-INF) ] | | | | | 2 |
| MSB | | | Application Data Message = <any value> ... | | | | | 3 |
| | | | | | | | LSB | n |

As shown in the table above, a new suggested value "001000" is defined in the Data Burst Type to indicate that the application data message carries the HRPD network application data, i.e., the data carried by the Data Burst Message.

4) The extension of information elements in the ADDS User Part in the BS Service Request is listed below:

TABLE 4

| 7 | 6 | 5 | 4 | 3 | 2 | 1 | 0 | Octet |
|---|---|---|---|---|---|---|---|---|
| => ADDS User Part: A1 Element Identifier = [3DH] | | | | | | | | 1 |
| Length = <variable> | | | | | | | | 2 |
| Reserved | | | Data Burst Type = [[000110] (SDB), [001000] (HRPD-INF)] | | | | | 3 |
| MSB | | | Application Data Message = <any value> ... | | | | | 4 |
| | | | | | | | LSB | n |

As shown in the table above, a new suggested value "001000" is defined in the Data Burst Type to indicate that the application data message carries the HRPD network application data, i.e., the data carried by the Data Burst Message.

5) The extension of the Event element in the Event Notification includes:

TABLE 5

| => Event: A1 Element Identifier = [7EH] | 1 |
|---|---|
| Length = [01H] | 2 |
| Event Identifier = [0000 0001, 0000 0011] | 3 |

| Event Identifier Definition | |
|---|---|
| Binary Value | Meaning |
| 0000 0001 | 1x Registration |
| 0000 0010 | 1x Power Down |
| 0000 0011 | Relevant HRPD network data have been successfully sent to the AT |
| | Other values are reserved |

A new event identifier type is defined as in the above table to indicate that HRPD network application data have been successfully sent to the AT.

Figure 5:
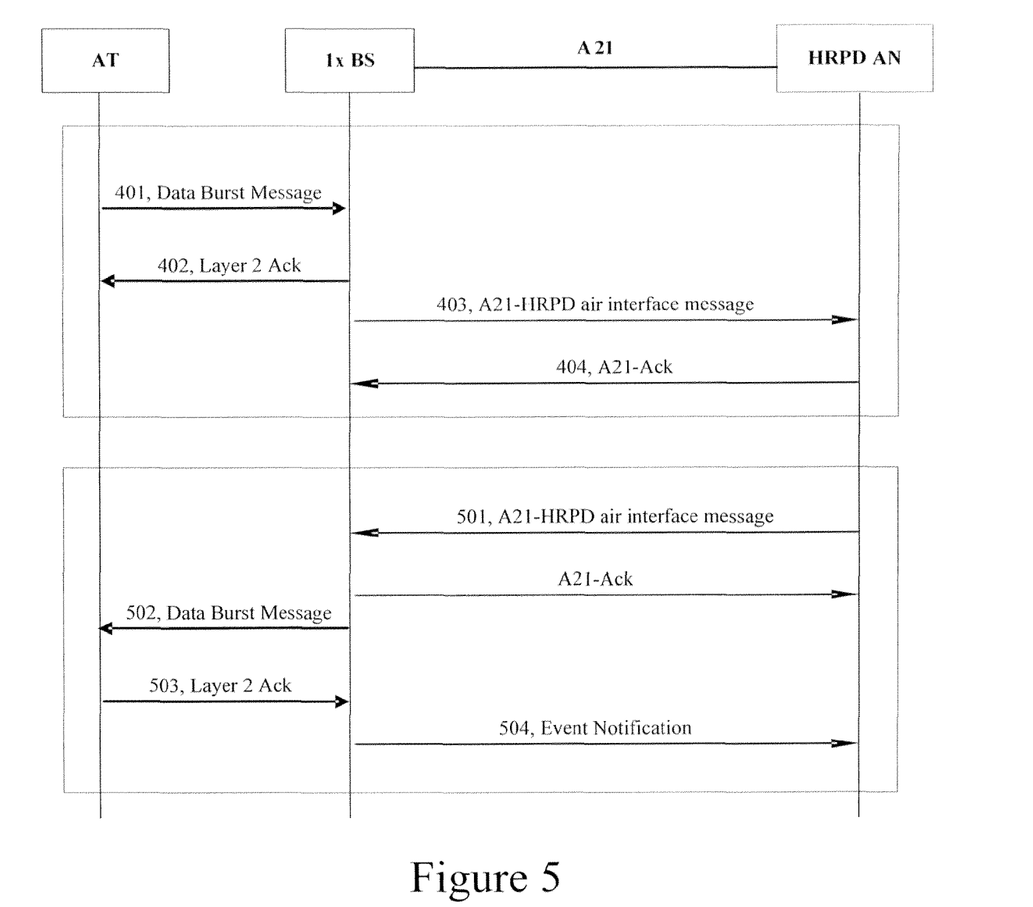
FIG. 5 is a flow chart of a second way for information interaction between an AT in the 1x network and an HRPD network according to an embodiment of the present invention.

The fore-going describes the first way to perform information interaction between the AT and the AN/PCF of the HRPD network. In the second way, the AT directly interacts with the AN/PCF through an A21 interface without a connection to the 1x MSC, as shown in FIG. 5, which includes:

a process of sending information by the AT to the AN/PCF, it further includes the following steps:

Step 401: send a Data Burst Message by the AT to the BS in the 1x network through a channel on the 1x network air interface;

Step 402: return a layer 2 Ack by the BS to the AT through the 1x network air interface;

Step 403: send an A21-HRPD air interface message by the BS to the AN/PCF through the A21 interface;

Step 404: return an A21-acknowledge message by the AN/PCF to the BS;

a process of sending information by the AN/PCF to the AT, it further includes the following steps:

Step 501: send an A21-HRPD air interface message by the AN/PCF to the 1x network BS;

Step 502: send a data bust message by the BS to the AT through the 1x network air interface after the BS returns an A21-acknowledge message to the AN/PCF;

Step 503: return a layer 2 Ack by the AT to the BS through the channel on the 1x network air interface;

Step 504: send an Event Notification by the BS to the AN/PCF notifying that the service data have been successfully sent to the AT.

Corresponding modifications of the protocol in the related art are required to connect the BS with the AN through the A21 interface in the fore-going process; the modifications include:

1) the same extensions on the Data Burst Message as described in the first way to perform information interaction between the AT and the AN/PCF of the HRPD network;

2) creation of three new A21 interface messages:

A21-HRPD air interface message, used for transmitting HRPD network related information between the BS and the AN/PCF;

A21-acknowledge message, used for responding to the A21-HRPD air interface message between the BS and the AN/PCF; and A21-event notification, used for notifying the AN/PCF that the relevant HRPD network data have been successfully sent to the AT.

The signaling transmission between the AT in the 1x network and the AN/PCF in the HRPD network is divided into two parts. The first part includes a signaling transmission through the air interface between the AT and the HRPD network. The second part includes a signaling transmission through a cable connection between the BS and the AN/PCF.

The foregoing is only the preferred embodiments of the present invention and is not for use in limiting the protection scope of the present invention.

What is claimed is:

1. A method for establishing a High Rate Packet Data (HRPD) network packet data service in a 1x network, comprising:

receiving, by a target Access Network/Packet Control Function (AN/PCF) of an HRPD network, a session establishment request from an Access Terminal (AT) through a channel on an air interface of the 1x network, wherein the AT is in a service in the 1x network and has an existing dormant session with the HRPD network;

establishing, by the target AN/PCF, an HRPD session with the AT after obtaining session information of the existing dormant HRPD session;

performing, by the target AN/PCF and the AT, a session configuration based on the obtained session information, and establishing a data connection for an HRPD network packet data service, wherein the channel is newly created on the air interface of the 1x network, and before the step of receiving a session establishment request from the AT, the method further comprises:

creating, by the AT, the channel on the air interface of the 1x network to bear an information flow between the AT and the HRPD network, wherein the step of creating the channel on the air interface of the 1x network to bear the information flow between the AT and the HRPD network comprises:
   sending, by the AT, an enhanced origination message to the BS;
   sending, by the BS, an adding service request to a Mobile Switching Center (MSC) after returning a BS acknowledgement instruction to the AT;
   returning, by the MSC, an assignment request;
   sending, by the AT, to the BS a service request which comprises a service configuration information record comprising a multiplex option, a traffic channel request and a service ID; and
   returning, by the BS, a service connection response which comprises a valid starting time of the service configuration and a service configuration information record comprising a multiplex option, a traffic channel assignment and a service ID.

2. The method according to claim 1, wherein the channel is a Supplementary Code Channel (SCCH) or a Supplementary Channel (SCH).

3. The method according to claim 2, wherein the channel carries the information flow between the AT and the HRPD network by service data.

* * * * *